United States Patent
Oredsson et al.

(10) Patent No.: US 7,979,049 B2
(45) Date of Patent: Jul. 12, 2011

(54) AUTOMATIC FILTER CONTROL

(75) Inventors: Filip Oredsson, Malmö (SE); Tony Petersson, Malmö (SE); Lars Sundström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 720 days.

(21) Appl. No.: 12/057,924

(22) Filed: Mar. 28, 2008

(65) Prior Publication Data
US 2009/0245438 A1 Oct. 1, 2009

(51) Int. Cl.
*H04B 1/16* (2006.01)

(52) U.S. Cl. .................. 455/343.2; 455/213; 455/232.1; 455/307; 455/343.1; 455/574

(58) Field of Classification Search .............. 455/343.2, 455/213, 232.1, 307, 343.1, 574, 343.5, 127.1, 455/127.2, 127.3, 127.5, 130, 136, 138, 230, 455/234.1, 240.1, 253.1, 293, 299, 306; 375/345; 370/442

See application file for complete search history.

(56) References Cited

U.S. PATENT DOCUMENTS

| | | | |
|---|---|---|---|
| 5,646,569 A | 7/1997 | Bruhns et al. | |
| 5,995,853 A * | 11/1999 | Park | 455/574 |
| 6,026,288 A * | 2/2000 | Bronner | 455/343.2 |
| 6,377,630 B1 * | 4/2002 | Uchida | 375/278 |
| 6,512,472 B1 | 1/2003 | Smith et al. | |
| 6,577,258 B2 | 6/2003 | Ruha et al. | |
| 6,670,901 B2 | 12/2003 | Brueske et al. | |
| 6,683,492 B2 * | 1/2004 | Krishnapura et al. | 327/552 |
| 6,782,062 B1 * | 8/2004 | Wieck | 375/345 |
| 6,876,635 B2 * | 4/2005 | Bremer et al. | 370/311 |
| 6,894,632 B1 | 5/2005 | Robinson | |
| 7,010,330 B1 | 3/2006 | Tsividis | |
| 7,076,231 B2 * | 7/2006 | Yamawaki et al. | 455/323 |
| 7,079,825 B2 * | 7/2006 | Wieck | 455/234.1 |
| 7,130,364 B2 | 10/2006 | Sintonen | |
| 7,209,528 B2 | 4/2007 | Prater | |
| 7,212,592 B2 | 5/2007 | Drapkin et | |

(Continued)

FOREIGN PATENT DOCUMENTS

EP 1363403 A1 11/2003

(Continued)

OTHER PUBLICATIONS

Yoshizawa, A. and Tsividis, Y., "A Channel-Select Filter with Agile Blocker Detection and Adaptive Power Dissipation," IEEE Journal of Solid-State Circuits, vol. 42, No. 5, May 2007, pp. 1090-1099.

(Continued)

*Primary Examiner* — Pablo N Tran
(74) *Attorney, Agent, or Firm* — Coats & Bennett, P.L.L.C.

(57) ABSTRACT

A method and apparatus for controlling the power consumption of a receiver based on current operating conditions is described herein. A receiver according to the present invention applies a received signal to a variable filter. The received signal includes a desired in-band signal. Depending on the current operating conditions, the received signal may further include one or more unwanted out-of-band blocking signals. A filter controller controls one or more operating parameters of the variable filter to maintain the power ratio at the filter output of the power of the blocking signal(s) to the in-band signal at or below a desired level. In so doing, the present invention controls the receiver power consumption while still providing the desired receiver performance.

24 Claims, 8 Drawing Sheets

U.S. PATENT DOCUMENTS

| | | |
|---|---|---|
| 7,266,361 B2 | 9/2007 | Burdett |
| 7,486,942 B2 * | 2/2009 | Sakurai .......... 455/314 |
| 2002/0177446 A1 | 11/2002 | Bugeja et al. |
| 2004/0042572 A1 * | 3/2004 | Palaskas et al. ......... 375/349 |
| 2005/0047534 A1 | 3/2005 | Lindoff et al. |
| 2006/0251186 A1 | 11/2006 | Qian |
| 2007/0035430 A1 | 2/2007 | Schreier et al. |
| 2007/0139238 A1 | 6/2007 | Van Veldhoven |
| 2007/0179734 A1 | 8/2007 | Chmiel et al. |
| 2008/0039042 A1 * | 2/2008 | Ciccarelli et al. ......... 455/234.1 |
| 2008/0039047 A1 | 2/2008 | Kubota |

FOREIGN PATENT DOCUMENTS

| | | |
|---|---|---|
| WO | 2007134201 | 11/2007 |

OTHER PUBLICATIONS

Serra-Graells, F., et al., "A True-1-V 300—W CMOS-Subthreshold Log-Domain Hearing-Aid-On-Chip," IEEE Journal of Solid-State Circuits, vol. 39, No. 8, Aug. 2004, pp. 1271-1281.

Yin, Q., et al., "A Translinear-Based RF RMS Detector for Embedded Test," IEEE, ISCAS 2004, pp. 245-248.

* cited by examiner

AUTOMATIC FILTER CONTROL

BACKGROUND

The present invention relates generally to wireless receivers, and more particularly to controlling power consumption of a wireless receiver based on performance requirements and current operating conditions.

Wireless receivers are designed to receive and process wireless signals so that the receiver meets the performance requirements, e.g., bit error rate, data rate, etc., defined by a controlling communication standard and associated with a known range of operating conditions. When a wireless receiver has a fixed design (e.g., is designed with fixed parameters), the receiver may be designed to accommodate the worst-case operating condition to ensure that the performance requirements are met for all operating conditions. For example, the receiver may be designed to meet a bit error rate requirement under a worst-case operating condition, i.e., when an out-of-band blocking signal strongly interferes with an in-band desired signal. Because worst-case operating conditions rarely occur, a receiver with a fixed design wastes power when the operating condition is better than the worst case.

Alternatively, a wireless receiver may have a dynamic design (e.g., may be designed with dynamically adjustable parameters). U.S. Pat. No. 7,010,330, for example, describes dynamically modifying the gain, bias points, or impedance level of a circuit element in a receiver depending on the quality of a received signal. For example, if the received signal has good quality, the receiver gain may be reduced to reduce the overall power consumption of the receiver. If the received signal has poor signal quality, the receiver gain may be increased to provide the desired performance at the expense of higher power consumption.

SUMMARY

The present invention provides an alternate solution for controlling the power consumption of a receiver based on current operating conditions. Generally, a receiver according to the present invention receives a signal and applies the received signal to a variable filter. The received signal includes a desired in-band signal. Depending on the current operating conditions, the received signal may further include one or more unwanted out-of-band signals, referred to herein as blocking signals. The present invention controls one or more parameters of the variable filter to maintain a current ratio at the filter output between one or more blocking signal power levels and a desired signal power level such that the current ratio satisfies a predetermined criteria relative to a desired ratio level. For example, the present invention may control one or more parameters of the variable filter to maintain a current ratio at the filter output of the one or more blocking signal power levels to the desired signal power level at or below the desired ratio level. In so doing, the present invention limits the receiver power consumption while still providing the desired receiver performance.

According to one exemplary embodiment, a wireless receiver comprises a variable filter, a power measurement element, and a controller. The variable filter filters a received signal. The power measurement element measures a total power and an in-band power of the filtered signal. The controller compares the total power with the in-band power, and controls one or more operating parameters of the variable filter based on the comparison to achieve a desired receiver performance while minimizing the receiver power consumption. In one embodiment, the controller may compare the total and in-band powers by subtracting the total and in-band powers. In another embodiment, the controller may compare the total and in-band powers by determining a ratio between the total and in-band powers.

For example, if an error value calculated based on the comparison indicates that blocker signals are too strong relative to the desired signal, the controller may increase the out-of-band attenuation of the filter relative to the passband to further filter the blocking signal(s), and therefore, to provide the desired ratio between the blocking and desired signals. By adjusting the filter parameters to achieve the desired ratio level, the controller provides the required receiver performance at the expense of an increase in receiver power consumption. If, however, the calculated error value indicates that the blocker signals are being filtered more than necessary, the controller may decrease the out-of-band attenuation. Such a decrease reduces the receiver power consumption without adversely affecting the receiver performance.

DETAILED DESCRIPTION

Wireless receivers are designed to receive and process wireless signals so that the receiver meets predetermined performance requirements, e.g., bit error rate, data rate, etc. defined by a controlling communication standard. Because the receiver performance may change as the operating conditions change, the receiver must further be designed to accommodate a variety of operating conditions. Fixed wireless receiver designs are typically configured for worst-case operating conditions. Because such worst-case operating conditions are rare, wireless receivers having a fixed design typically consume unnecessarily large amounts of power.

The present invention provides a dynamic receiver design that controls receiver performance by controlling parameters of a variable filter applied to a received signal based on current operating conditions that impact the strength and presence of out-of-band blocking signals in the received signal. The filter passes the in-band signal and attenuates the blocking signals according to a filter transfer function. Whenever the blocking signals have a sufficiently low power level relative to the desired in-band signal, the out-of-band attenuation of the filter may be decreased to save power. In other words, by controlling the filter based on the current operating conditions, e.g., the strength of blocking signals, the present invention provides a receiver that achieves a desired performance without consuming unnecessary power.

Figure 1:
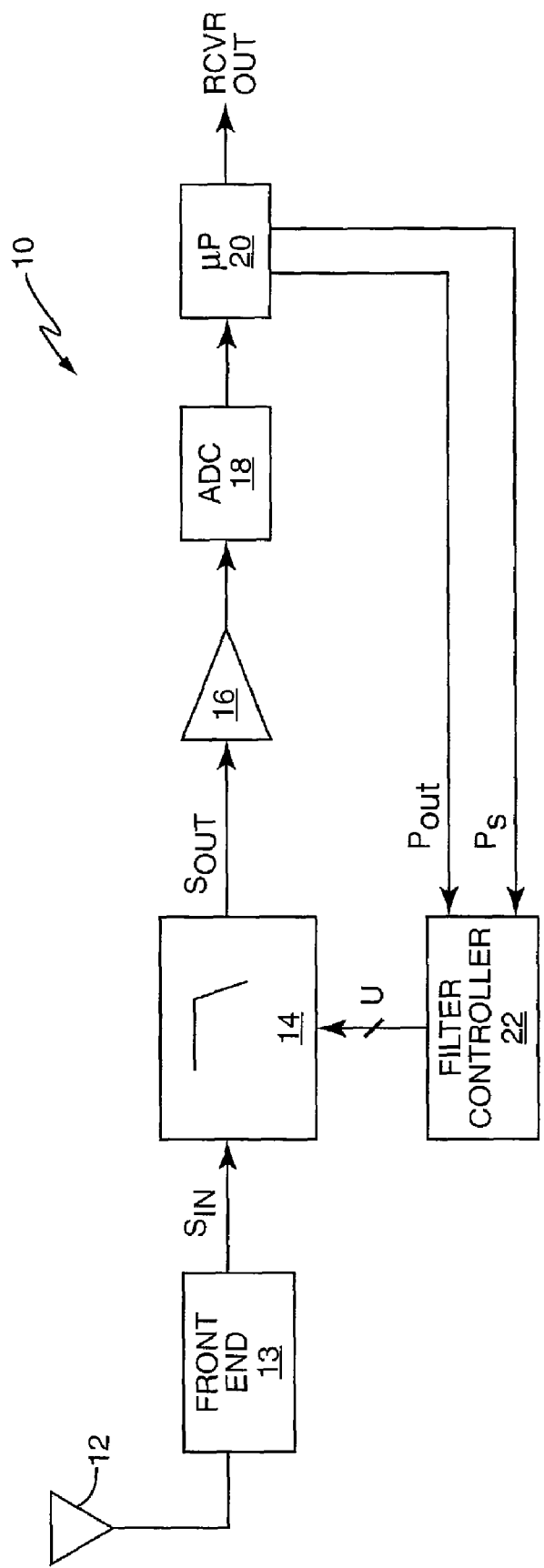
FIG. 1 shows a block diagram of a receiver according to one exemplary embodiment of the present invention.

FIG. 1 shows an exemplary receiver 10 according to one embodiment of the present invention. Receiver 10 comprises an antenna 12, receiver front-end 13, variable filter 14, optional amplifier 16, analog-to-digital converter (ADC) 18, digital processor 20, and filter controller 22. The receiver front-end 13 comprises amplifiers, mixers, etc. to process the signal received by antenna 12 according to any known means to generate an input signal $S_{IN}$. Filter 14 filters $S_{IN}$ according to a current filter transfer function to generate a filtered signal $S_{OUT}$. When included, amplifier 16 amplifies the filtered signal $S_{OUT}$ a desired amount to reduce dynamic range requirements for the ADC 18. It will be appreciated that the amplifier 16 does not affect the filter control of the present invention. ADC 18 converts the filtered signal $S_{OUT}$ to a digital signal according to any known means. For example, ADC 18 may comprise any type of ADC, e.g., a delta-sigma ADC, a direct conversion ADC (e.g., a flash ADC), a successive approximation ADC, etc. Processor 20 comprises any known digital processing circuit that digitally processes the received signal to generate the receiver output signal. Exemplary processors 20 may be implemented in a single processor or in multiple processors and include, but are not limited to, general purpose and/or special purpose microprocessors and digital signal processors. In one exemplary embodiment, the processor 20 further measures the total power $P_{out}$ and the in-band power $P_s$ of the filtered signal $S_{OUT}$, and provides the results to filter controller 22. Filter controller 22 generates one or more control signals U to control one or more operating parameters of the filter 14 based on a comparison between the provided signal powers $P_{out}$, $P_s$. For example, the control signal U may control an order of the filter, a passband gain of the filter, and/or a filter transfer function. Control signal U may comprise an analog and/or digital signal, depending on the implementation of the filter 14, that controls the filter 14 either continuously or in discrete steps.

Figure 2:
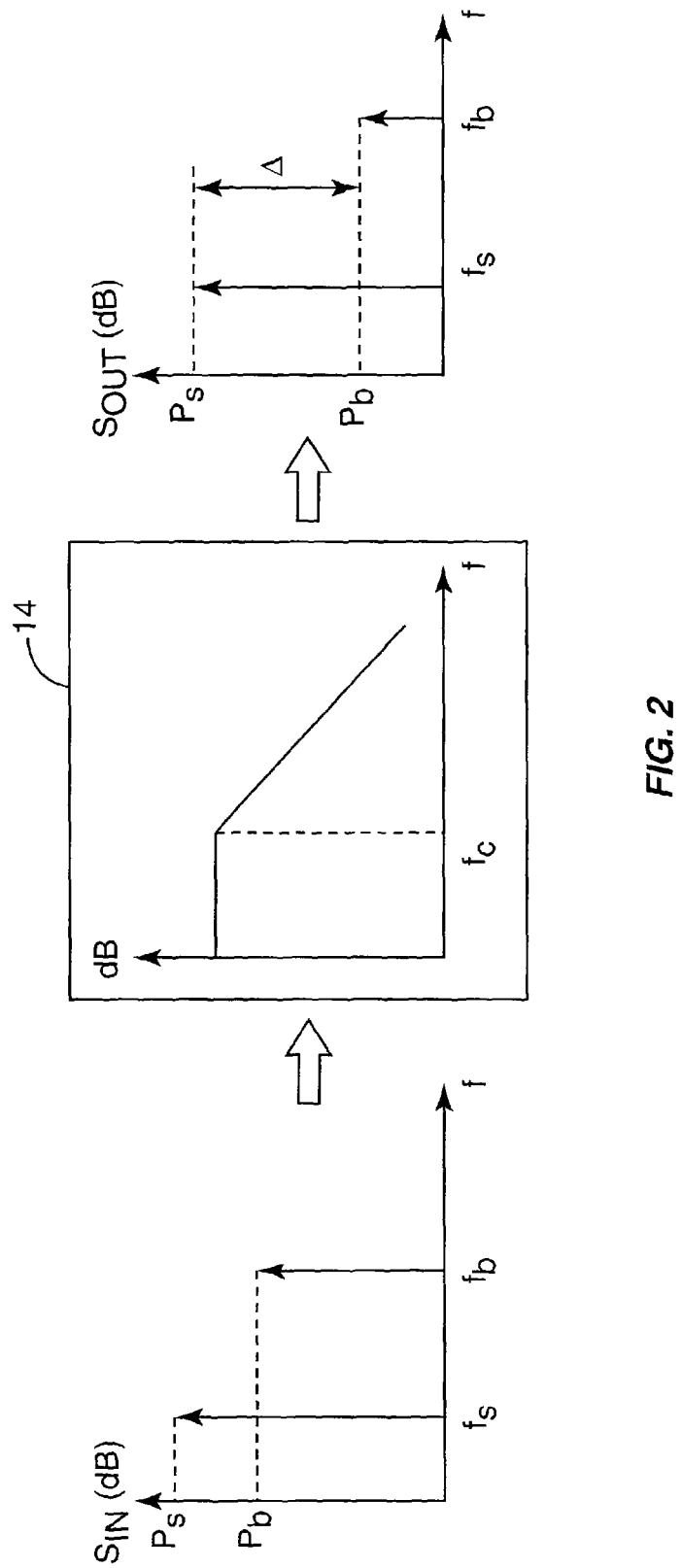
FIG. 2 shows the filtering process for a received signal.

FIG. 2 shows an example of the effect of filter 14 on the input signal $S_{IN}$. The total power $P_{IN}$ of an input signal $S_{IN}$ containing one in-band signal and one blocking signal (see left plot of FIG. 2) may be represented by:

$$P_{IN} = P_s + P_b. \quad (1)$$

As shown by FIG. 2, filter 14 filters the input signal $S_{IN}$ based on current filter operating parameters to pass the desired in-band signal at frequency $f_s$ and to attenuate the blocking signal(s) at frequency $f_b$. The total power $P_{OUT}$ of the resulting output signal $S_{OUT}$ may be represented by:

$$P_{OUT} = G^2 P_s + A^2(f_b) P_b, \quad (2)$$

where G represents the gain of the filter passband and $A(f_b)$ represents the transfer function of the filter 14 for the blocking signal frequency. By attenuating the blocking signal according to $A(f_b)$, filter 14 controls the power ratio between the in-band signal power $P_s$ and the blocking signal power $P_b$.

The present invention seeks to maintain a desired power ratio $\Delta_r$ between the blocking signal power $P_b$ and the in-band signal power $P_s$ of the filtered output signal $S_{OUT}$ such that the desired power ratio satisfies a predetermined criteria relative to a desired value. For example, when the power ratio $\Delta_r$ is represented by:

$$\Delta_r = \frac{A^2(f_b) P_b}{G^2 P_s}, \quad (3)$$

the present invention seeks to maintain the power ratio $\Delta_r$ at or below the desired value. As shown by FIG. 2 and Equation (3), controlling the operating parameters of the filter 14, e.g., the passband gain, the filter transfer function, the order of the filter, etc., controls the power ratio $\Delta_r$ achieved by the filter 14. For simplicity, the following describes the invention in terms of the power ratio defined by Equation (3). However, it will be appreciated that the power ratio $\Delta_r$ may alternatively be expressed as a function of the ratio of the in-band signal power $P_s$ to the blocking signal power $P_b$, where the present invention would maintain such a ratio at or above the desired value.

Because processor 20 extracts the desired in-band signal from the filtered signal $S_{OUT}$, the processor 20 may measure the power $P_s$ of the in-band signal according to any known means. Further, the processor 20 may measure the total power $P_{OUT}$ of the filtered signal $S_{OUT}$. However, the power of the blocking signal(s) $P_b$ is not as easily obtained. To overcome this problem, Equation (2) may be rearranged and substituted into Equation (3) to define the ratio $\Delta_r$ in terms of the in-band signal power $P_s$ and the total output power $P_{OUT}$, as given by Equation (4).

$$\Delta_r = \frac{A^2(f_b) P_b}{G^2 P_s} = \frac{P_{OUT} - G^2 P_s}{G^2 P_s} = \frac{P_{OUT}}{G^2 P_s} - 1. \quad (4)$$

It will be appreciated that $\Delta_r$ may be expressed in terms of a power differential based on a ratio between the total output power $P_{OUT}$ and the in-band signal power $P_s$ (e.g., when $P_s$ and $P_{OUT}$ are expressed in terms of a linear power scale), as shown by Equation (4). It will be appreciated that while Equation (4) expresses $\Delta_r$ as a function of the ratio of $P_{OUT}$ to $P_s$, $\Delta_r$ may alternatively be expressed as a function of the ratio of $P_s$ to $P_{OUT}$. Further, when $P_s$ and $P_{OUT}$ are expressed in terms of a logarithmic power scale, $\Delta_r$ may be expressed as a function of a power differential computed based on a difference between the total output power $P_{OUT}$ and the in-band signal power $P_s$, e.g., as a function of $P_{OUT} - P_s$. Regardless, processor 20 may determine and provide the in-band signal power $P_s$ and the total output power $P_{OUT}$ to the filter controller 22 to support the filter control process of the present invention.

Figure 3:
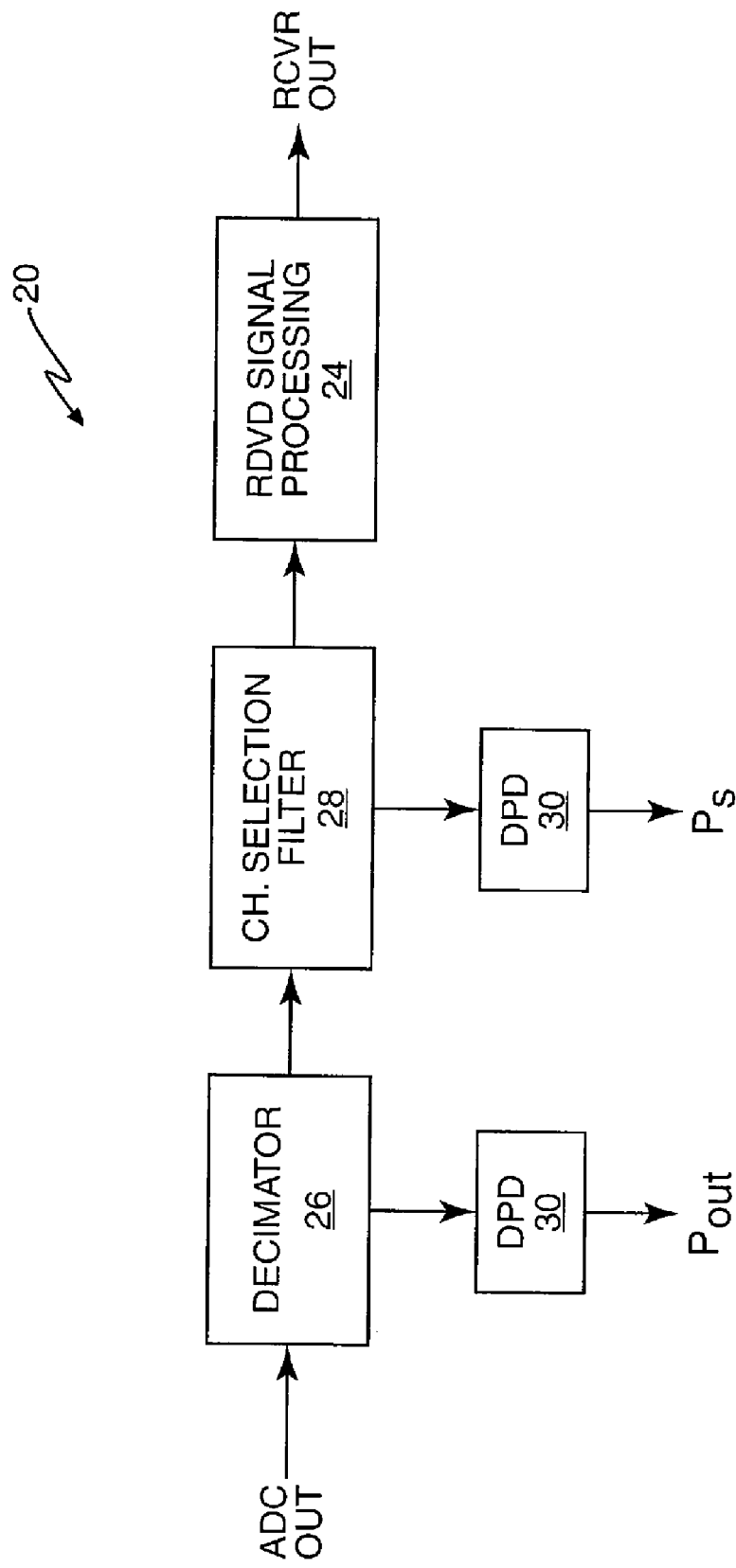
FIG. 3 shows a block diagram of a digital processor for the receiver according to one exemplary embodiment of the present invention.

FIG. 3 shows one exemplary digital processor 20 for the receiver 10 of FIG. 1. Processor 20 includes received signal processing elements 24, decimator 26, channel selection filter 28, and digital power detectors 30. Decimator 26 reduces the sampling rate of the input digital signal and provides the decimated signal to the digital power detector 30 and to the channel selection filter 28. The channel selection filter 28 comprises a sharp filter that filters the decimated signal to obtain the desired in-band signal. Received signal processing elements 24 demodulate, decode, and otherwise process the in-band signal to generate the receiver output signal according to any known means. Power detectors 30 measure the power of the decimated signal output by the decimator 26 and the in-band signal output by the channel selection filter 28 to determine the total output power $P_{OUT}$ and the in-band signal power $P_s$, respectively. In one example, the digital power detectors 30 may comprise a sliding window detector that calculates the average power of the signal over time. In any event, processor 20 outputs the total output power $P_{OUT}$ and the in-band signal power $P_s$ to the filter controller 22. For this embodiment, the filter controller 22 will take into consideration the gain/attenuation of the channel selection filter 28 when determining the current power differential based on the total output power $P_{OUT}$ and the in-band signal power $P_s$.

Figure 4:
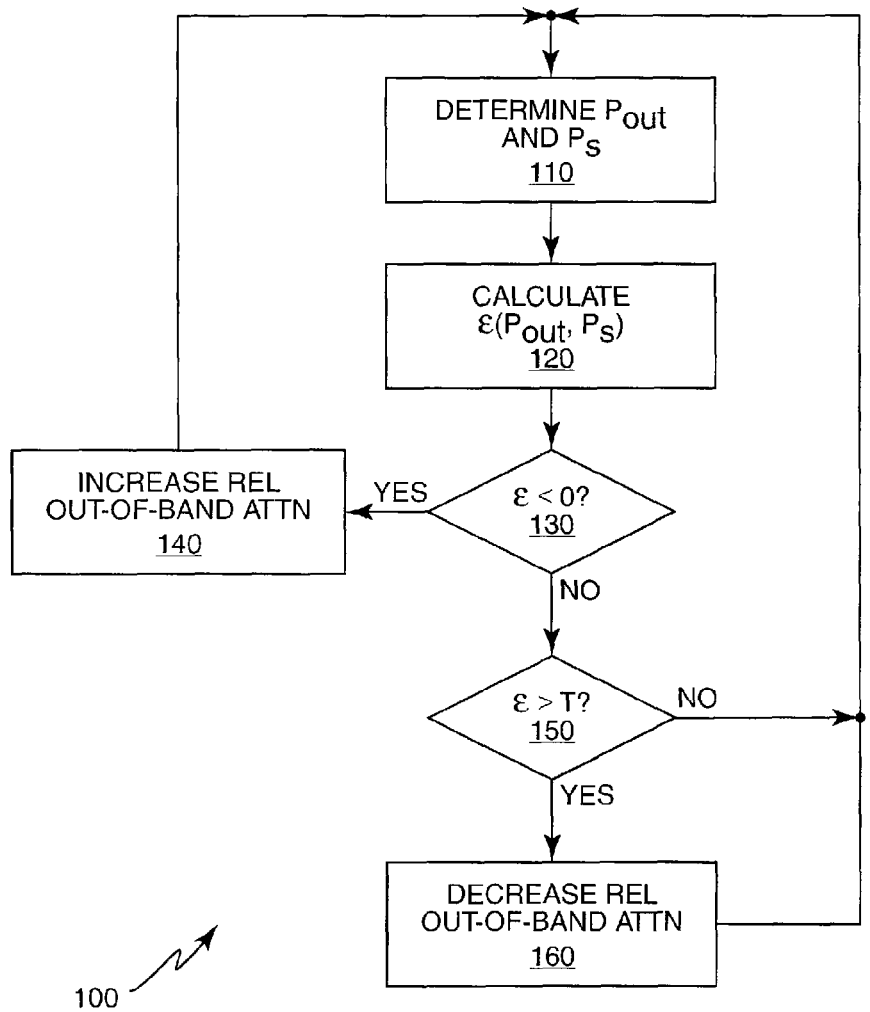
FIG. 4 shows one exemplary process for controlling filter parameters to control power consumption of a receiver.

FIG. 4 shows an exemplary filter control process 100 implemented by filter controller 22 according to one embodiment of the present invention. The receiver 10 determines the in-band signal power $P_s$ and the total output power $P_{OUT}$ (block 110) and provides the results to the filter controller 22. Filter controller 22 calculates an error value $\epsilon$ based on the provided in-band and total powers $P_s$, $P_{OUT}$ (block 120). More particularly, filter controller 22 calculates the current ratio $\Delta_r$ according to Equation (4), and compares the current ratio $\Delta_r$ to a limiting power ratio $\Delta_o$ required for acceptable receiver performance to determine the error value $\epsilon$. When the power ratio $\Delta_r$ is given by Equation (4), the limiting power ratio $\Delta_o$ represents a maximum power ratio, and the error value $\epsilon$ may, for example, be given by Equation (5).

$$\epsilon(P_s, P_{OUT}) = \Delta_o - \Delta_r \qquad (5)$$

It will be appreciated that a limiting power ratio $\Delta_o$ for each defining communication standard may be pre-determined based on the standard-specific requirements for the in-band and blocking signal powers according to Equation (3) and stored in memory (not shown). These requirements may be static or dynamic, and thus, the limiting power ratio $\Delta_o$ may also be static or dynamic.

The error $\epsilon$ represents how sufficient or insufficient the out-of-band attenuation of filter 14 is. When the error $\epsilon$ is negative (block 130), the filter controller 22 generates a control signal U to increase the out-of-band attenuation of the filter 14 to decrease the power ratio of the blocking signals to the in-band signals at the expense of increased receiver power consumption (block 140). When the error $\epsilon$ is positive (block 130) but greater than some predetermined threshold T (block 150), the filter controller 22 generates a control signal U to decrease the out-of-band attenuation of the filter 14 to reduce the power consumption of the filter (block 160) without compromising the existing power ratio of the blocking to the in-band signals. When the error $\epsilon$ is positive (block 130) and less than the threshold T (block 150), the filter controller 22 generates a control signal U that maintains the current operating parameters of the filter 14.

The threshold T of block 150 provides optional hysteresis control with respect to the error $\epsilon$. A negative error $\epsilon$ indicates that the power ratio $\Delta_r$ between the blocking and in-band signals is too large. Thus, for a negative error $\epsilon$, the amount of out-of-band attenuation may be increased unconditionally. However, a positive error $\epsilon$ indicates that the power ratio $\Delta_r$ between the blocking and in-band signals is smaller than necessary for acceptable receiver performance. Thus, for a positive error $\epsilon$ the filter controller 22 may either maintain the current filter configuration or may decrease the out-of-band attenuation. The threshold T may be used to provide hysteresis to avoid oscillation around the optimal attenuation setting. It will be appreciated that when the threshold T is set to zero, the process 100 of FIG. 4 eliminates block 150.

Filter controller 22 may modify the out-of-band attenuation by modifying the filter transfer function $A(f_b)$ for out-of band signals, by modifying the order of the filter 14, by rearranging the poles and/or zeros in the filter 14, and/or by modifying the passband gain of the filter 14 relative to the out-of-band attenuation. Consider the example where filter 14 comprises a Butterworth filter and filter controller 22 directly translates the error signal $\epsilon$ to a control signal U that in turn corresponds to the order of the Butterworth filter 14. The worst-case scenario for the filter 14 in this example may be defined by a 5 MHz in-band signal at a minimum level of −74 dBm ($P_s$) and a 20 MHz blocking signal at −52 dBm ($P_b$). The bandwidth of filter 14 ($f_c$) is 10 MHz. In practice, the worst-case filter scenario may be derived from the performance requirements of the filter 14. Under these conditions, a controlling standard may require the blocking signal to be attenuated by 30 dB. Using this information with Equation (3) and assuming the passband gain (G) is 1 V/V, the limiting required power ratio $\Delta_o$ may be determined according to:

$$\Delta_o = \frac{A^2(f_b) P_b}{G^2 P_s} = \frac{\left(10^{\frac{-30}{20}}\right)^2 10^{-3} 10^{\frac{-52}{10}}}{1^2 10^{-3} 10^{\frac{-74}{10}}} = 0.14 \qquad (6)$$

A 30 dB attenuation at 20 MHz requires a $5^{th}$ order Butterworth filter for the worst case and thus sets the upper limit for U. The lower limit is zero, which means the filter 14 is bypassed.

Figure 5:
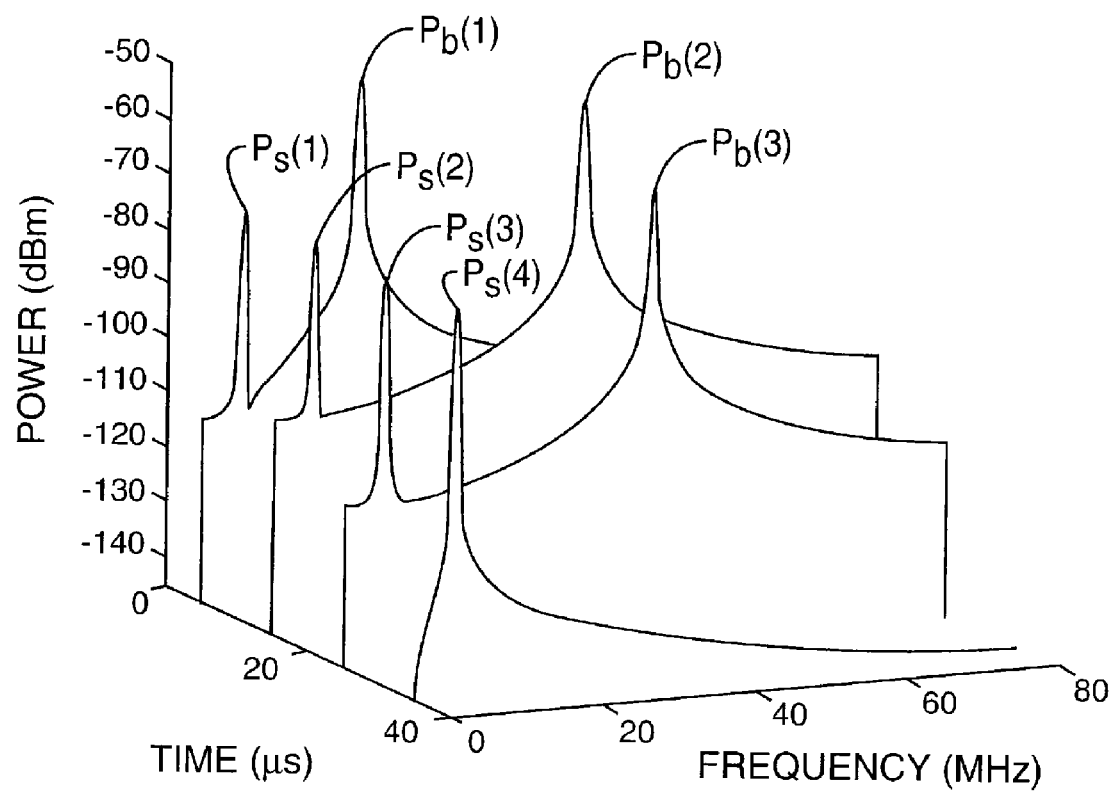
FIG. 5 shows a three-dimensional plot of a filter input signal.

FIG. 5 shows four different input signal scenarios, where all four scenarios have the same in-band signal power level ($P_s$) but different blocking signal power levels ($P_b$). The power levels for the different scenarios are numbered 1, 2, 3, or 4 depending on the scenario. The first scenario represents the worst-case scenario and lasts for 10 µs. Between 10 µs and 20 µs, the blocking signal has the same power level but has moved from 20 MHz to 40 MHz. Between 20 µs and 30 µs the blocking signal stays at 40 MHz but decreases in power from −52 dBm to −62 dBm. Between 30 µs and 40 µs, the blocking signal disappears entirely.

The first scenario (t=0) requires the $5^{th}$ order Butterworth filter. However, for the remaining three scenarios the filter requirements may be relaxed to reduce the power consumption of the filter 14, and therefore the receiver 10. The means by which the order of the filter 14 is changed may be as simple as decreasing and increasing the order by a fixed amount based on the sign of the error $\epsilon$ (see the process 100 of FIG. 4). For example, the filter order N at time n may be calculated according to:

$$N_n = N_{n-1} - \Delta_N \cdot \text{sign}(\epsilon_n), \qquad (7)$$

where $N_n$ represents the new filter order, $N_{n-1}$ represents the previous filter order, and $\Delta_N$ represents the order step size. The sign(x) function may be defined by:

$$\text{sign}(x) = \begin{cases} 1 & \text{for } x > 0 \\ -1 & \text{for } x < 0 \\ 0 & \text{for } x = 0 \end{cases} \qquad (8)$$

In practice, the filter order may be limited by the range implemented in the filter 14, and therefore, the result obtained by Equation (7) may be limited to this range. In this first example, the filter order changes irrespective of the magnitude of $\epsilon_n$, and several iterations of the process 100 of FIG. 4 may be required to reach the optimal solution.

Alternatively, a more elaborate expression for computing the filter order N at time n may be given by:

$$N_n = 5 - \frac{K}{N_{n-1} + 1} \epsilon_n. \qquad (9)$$

The filter order is rounded up to the nearest integer to make sure the controlling communication standard is met at all times. For this example, $N_n$ is limited to the range [0, 1, 2, 3, 4, 5].

Increasing/decreasing the attenuation of the blocking signal by changing the filter order is strongly dependent on the current and calculated order of the filter 14. Asymptotically, any filter has an amplitude function that is inversely proportional to $f_b^N$. This is a very coarse approximation of any filter, but may none-the-less provide guidance on how to compensate for the attenuation dependency on the filter order. This dependency is partly addressed by Equation (9) by dividing the error signal $\epsilon_n$ by a previous filter order $N_{n-1}+1$. As a result, the step size of the filter order change is less when the previous filter order $N_{n-1}$ is high, and more when the previous filter order $N_{n-1}$ is low. Further, Equation (9) introduces a gain factor K as an additional means for controlling the step size in a fashion similar to $\Delta_N$ of Equation (7). Higher gain factors K translate to larger step sizes towards the optimal solution (and therefore faster convergences), whereas lower gain factors translate to smaller step sizes (and therefore slower convergences). If the gain factor K is too large, the filter order may be overcompensated and may miss the optimal filter order. Therefore, the characteristics of the filter 14 used in practice will determine the optimal gain factor K. Given this, the gain factor K may generally be determined empirically through simulation.

Figure 6:
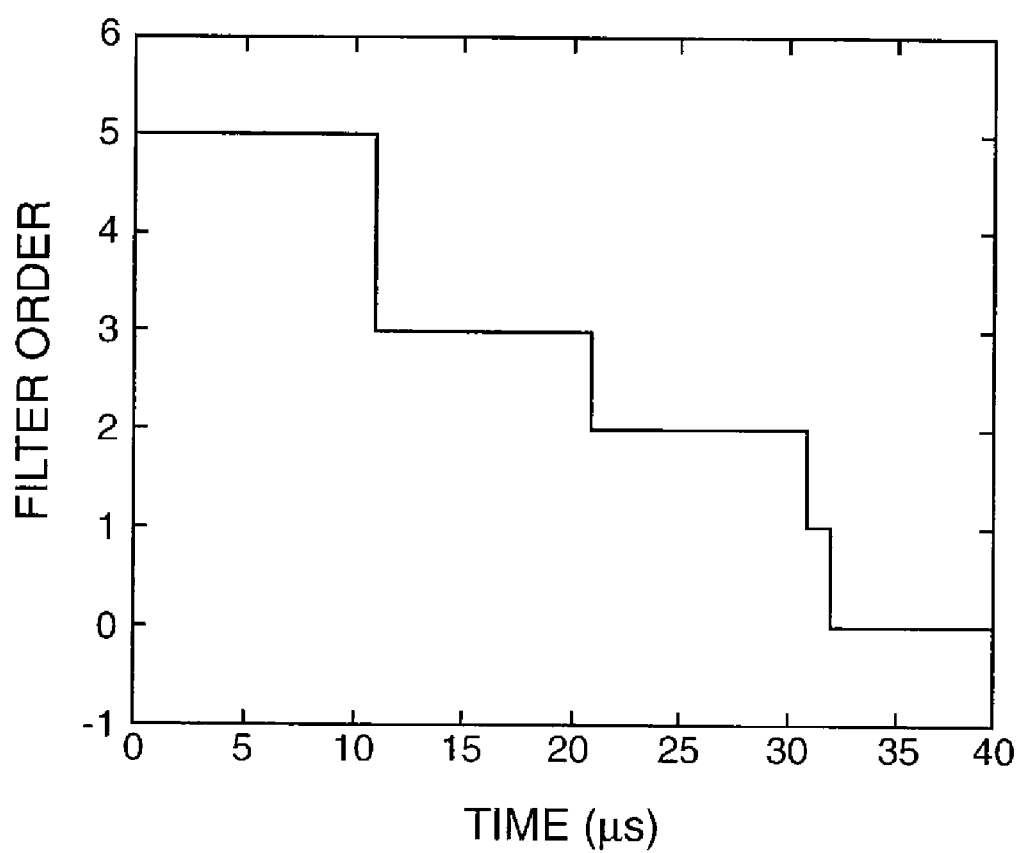
FIG. 6 shows an example of filter control over time for the filter input signal of FIG. 5.
Figure 7:
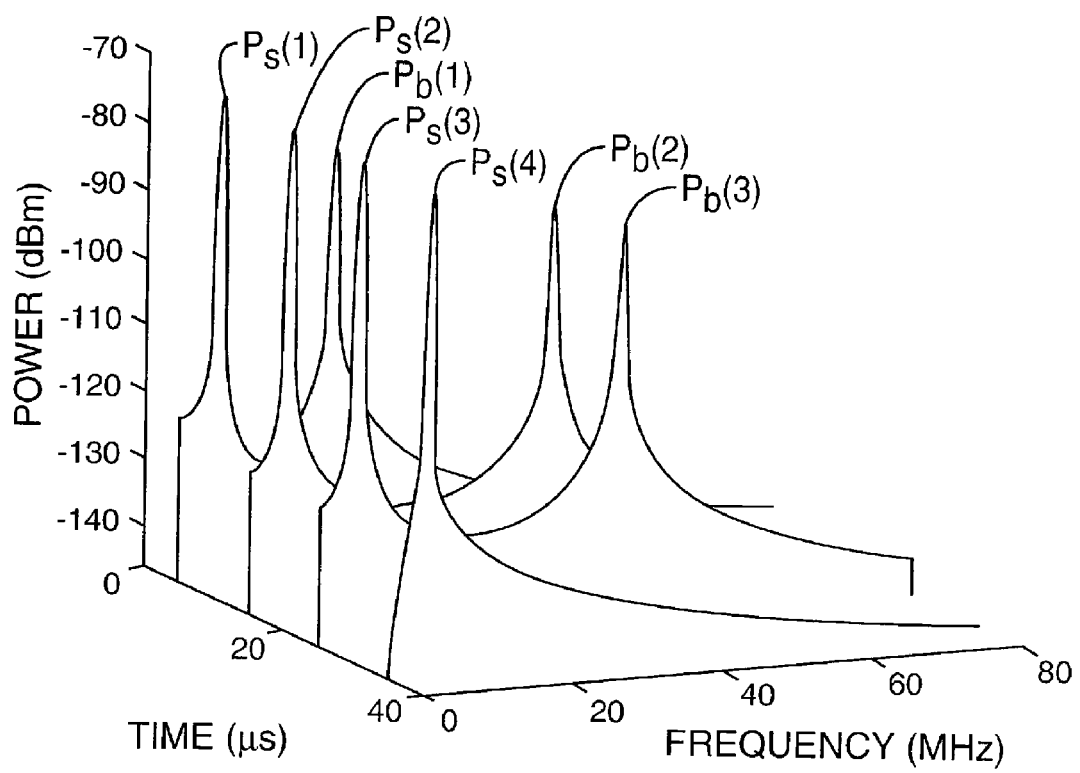
FIG. 7 shows a three-dimensional plot of a filter output signal resulting from the filter input signal of FIG. 5 and the filter control of FIG. 6.

FIG. 6 shows how the filter order changes for the above example when the gain factor K of Equation (9) is set to 60. FIG. 7 shows the resulting filtered signals $S_{OUT}$ for the four different scenarios. As shown by FIG. 7, controlling the filter order based on the power ratio $\Delta_r$ between the blocking and in-band signals provides the required receiver performance without requiring the receiver 10 to continuously operate under worst-case conditions.

Figure 8:
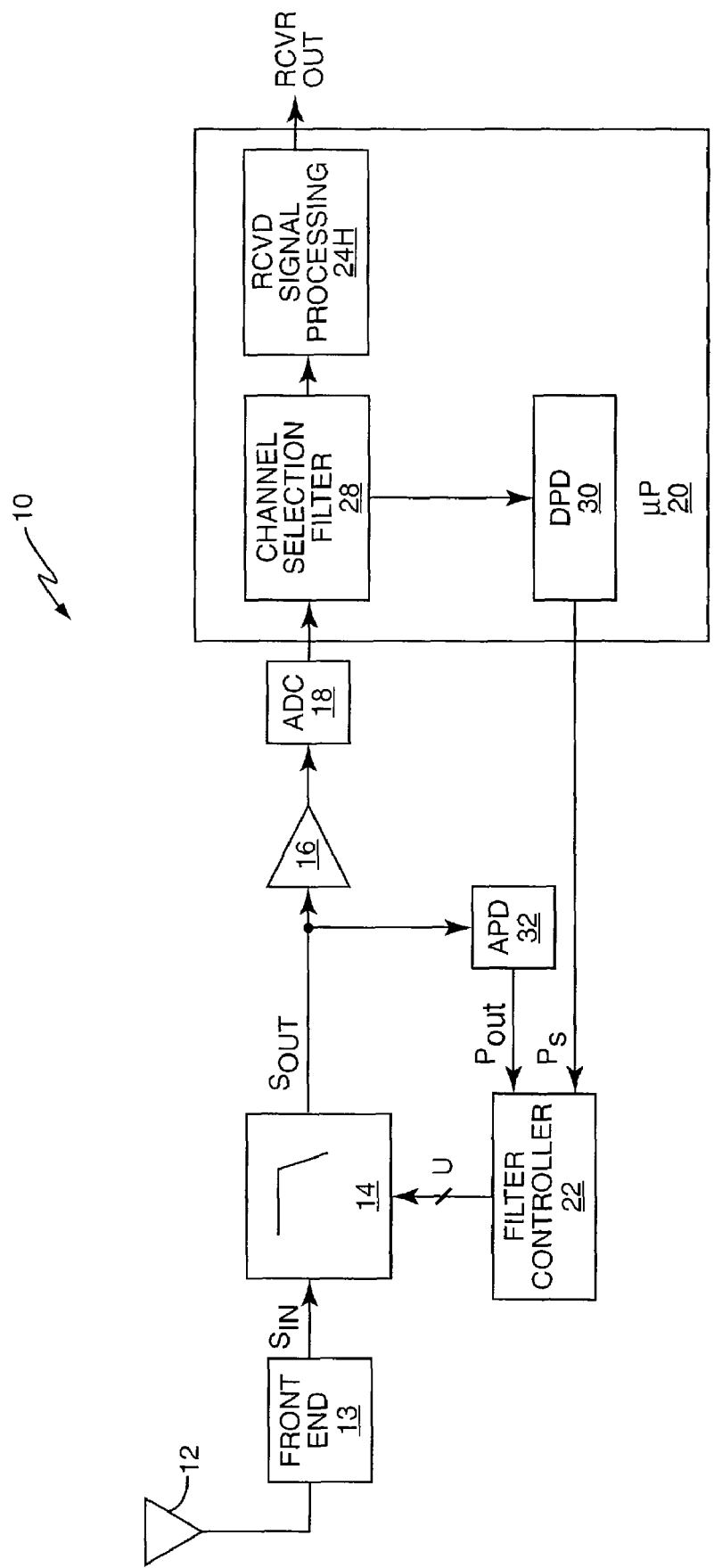
FIG. 8 shows a block diagram of a receiver according to another exemplary embodiment of the present invention.

The present invention is not limited to the digital power detection of FIGS. 1 and 3. For example, FIG. 8 shows an alternate receiver 10 that measures the total output power $P_{OUT}$ in the analog domain and measures the in-band signal power $P_s$ in the digital domain. For this embodiment, the channel selection filter 28 processes the digitized signal to obtain the desired in-band signal and the digital power detector 30 measures the power of the channel selection filter output to determine the in-band signal power $P_s$. Further, an analog power detector 32 measures the total power of the analog filter output signal $S_{OUT}$ to determine the total output power $P_{OUT}$, e.g., using a sliding window detector to obtain an average total power of the analog filter output signal. For example, analog power detector 32 may implement a translinear circuit technique or may comprise a basic multiplication circuit to obtain a linear representation of the total output power $P_{OUT}$. If the filter controller 22 requires a logarithmic representation of the total output power $P_{OUT}$, receiver 10 may further include a logarithmic amplifier (not shown) to convert the linear power value to a logarithmic power value.

For the embodiment of FIG. 8, filter controller 22 takes into consideration the gain/attenuation of the amplifier 16, ADC 18, and channel selection filter 28 when determining the current power differential based on the total output power $P_{OUT}$ and the in-band signal power $P_s$. The attenuation of the channel selection filter 28 is known, but the gain/attenuation of amplifier 16 and ADC 18 are estimated. Thus, for this embodiment, the filter control accuracy depends on the accuracy of the gain/attenuation estimation of the amplifier 16 and ADC 18.

The filter controller 22 of the present invention may run synchronously or asynchronously with the digital processor 20 depending on the receiver requirements. For example, if the controlling standard requires the filter controller 22 to adapt the filter parameters quickly, e.g., in a timeslot between received signal blocks, to accommodate fast variations in the input signal quality, the filter controller 22 may run synchronously with the processor 20. If the variations in the filter parameters are small enough such that the filter characteristics are generally constant over each received signal block in time and that the filter parameters may be treated as channel variations, the filter controller 22 may run asynchronously from the processor 20.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of controlling power consumption of a receiver comprising:
 filtering a received signal using a variable filter to generate a filtered signal at a filter output; and
 controlling a power consumption of the receiver by controlling one or more properties of the variable filter to maintain a current ratio at the filter output between one or more blocking signal power levels and a desired signal power level such that the current ratio satisfies a predetermined criteria relative to a desired ratio level.

2. The method of claim 1 wherein controlling the power consumption of the receiver comprises controlling one or more properties of the variable filter to maintain a current ratio at the filter output of the one or more blocking signal power levels to the desired signal power level at or below the desired ratio level.

3. The method of claim 1 further comprising:
 measuring a total power and an in-band power of the filtered signal; and
 comparing the total power to the in-band power to determine a current power differential.

4. The method of claim 3 wherein controlling one or more properties of the variable filter comprises controlling one or more properties of the variable filter such that the current power differential satisfies the predetermined criteria relative to a desired differential level.

5. The method of claim 3 wherein measuring the total power and the in-band power comprises digitally measuring the total power and the in-band power of the filtered signal.

6. The method of claim 3 wherein measuring the total power and the in-band power comprises digitally measuring the in-band power of the filtered signal and obtaining an analog measurement of the total power of the filtered signal.

7. The method of claim 3 wherein comparing the total power to the in-band power comprises determining the current power differential based on a ratio between the total power and the in-band power.

8. The method of claim 3 wherein comparing the total power to the in-band power comprises determining the current power differential based on a difference between the total power and the in-band power.

9. The method of claim 3 further comprising:
 determining a limiting power differential based on requirements for a controlling communication standard; and
 comparing the limiting power differential to the current power differential to determine an error signal;
 wherein controlling one or more properties of the variable filter comprises controlling one or more properties of the variable filter based on the error signal.

10. The method of claim 1 wherein controlling one or more properties of the variable filter comprises controlling an order of the variable filter.

11. The method of claim 1 wherein controlling one or more properties of the variable filter comprises controlling a transfer function of the variable filter.

12. The method of claim 1 wherein controlling one or more properties of the variable filter comprises controlling a passband gain of the variable filter relative to an out-of-band attenuation of the filter.

13. A filter system configured to control power consumption of a receiver, said filter system comprising:
  a variable filter configured to filter a received signal to generate a filtered signal at a filter output; and
  a controller configured to control a power consumption of the receiver by controlling one or more properties of the variable filter to maintain a current ratio between one or more blocking signal power levels at the filter output and a desired signal power level at the filter output such that the current ratio satisfies a predetermined criteria relative to a desired ratio level.

14. The filter system of claim 13 wherein the controller controls the power consumption of the receiver by controlling one or more properties of the variable filter to maintain a current ratio of the one or more blocking signal power levels at the filter output to the desired signal power level at the filter output at or below a desired ratio level.

15. The filter system of claim 13 further comprising one or more power measurement elements configured to measure a total power and an in-band power of the filtered signal, wherein the controller is further configured to determine a current power differential based on a comparison between the total power and the in-band power.

16. The filter system of claim 15 wherein the controller controls one or more properties of the variable filter by controlling one or more properties of the variable filter such that the current power differential satisfies the predetermined criteria relative to a desired differential level.

17. The filter system of claim 15 wherein the power measurement elements comprise one or more digital power detectors configured to digitally measure the total power and the in-band power of the filtered signal.

18. The filter system of claim 15 wherein the power measurement elements comprise:
  a digital power detector configured to digitally measure the in-band power of the filtered signal; and
  an analog power detector configured to obtain an analog measurement of the total power of the filtered signal.

19. The filter system of claim 15 wherein the controller is configured to determine the current power differential based on a ratio between the total power and the in-band power.

20. The filter system of claim 15 wherein the controller is configured to determine the current power differential based on a difference between the total power and the in-band power.

21. The filter system of claim 15 wherein the controller is further configured to:
  determine a limiting power differential based on requirements for a controlling communication standard; and
  compare the limiting power differential to the current power differential to determine an error signal;
  wherein the controller controls the properties of the variable filter by controlling one or more properties of the variable filter based on the error signal.

22. The filter system of claim 13 wherein the controller is configured to control an order of the variable filter.

23. The filter system of claim 13 wherein the controller is configured to control a transfer function of the variable filter.

24. The filter system of claim 13 wherein the controller is configured to control a passband gain of the variable filter relative to an out-of-band attenuation of the filter.

* * * * *